No. 642,630. Patented Feb. 6, 1900.
J. T. RICHARDS.
GUIDE FOR STEMS OF STAMP MILLS, &c.
(Application filed Apr. 4, 1899.)
(No Model.) 2 Sheets—Sheet 1.
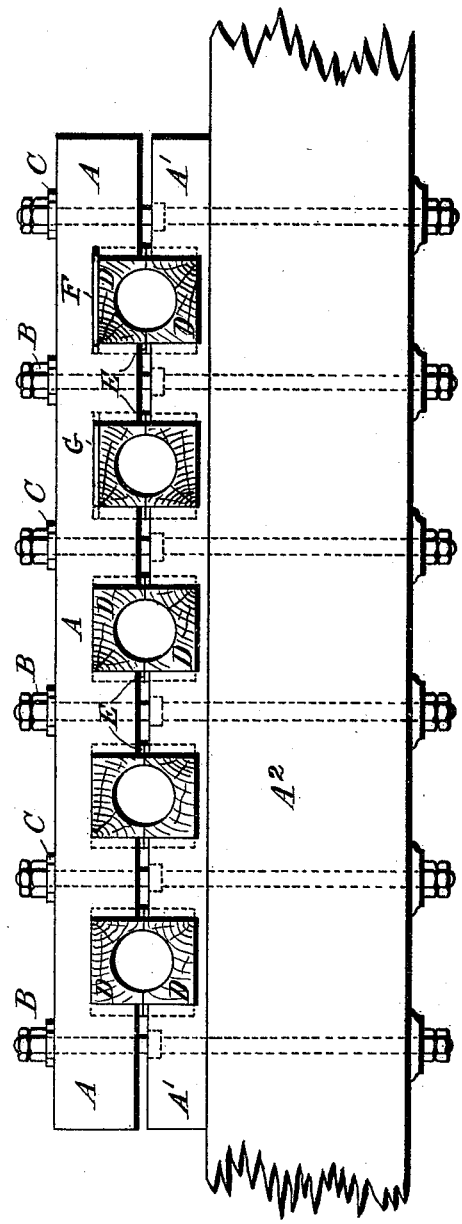
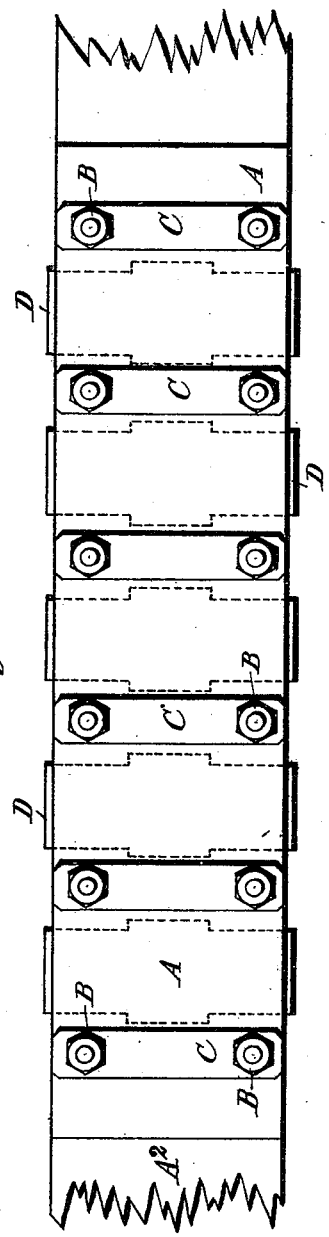
WITNESSES.
INVENTOR.
John Thomas Richards
by Fuller Freeman
Attorneys.
THE NORRIS PETERS CO., PHOTO-LITHO., WASHINGTON, D. C.

No. 642,630. Patented Feb. 6, 1900.
J. T. RICHARDS.
GUIDE FOR STEMS OF STAMP MILLS, &c.
(Application filed Apr. 4, 1899.)
(No Model.) 2 Sheets—Sheet 2.
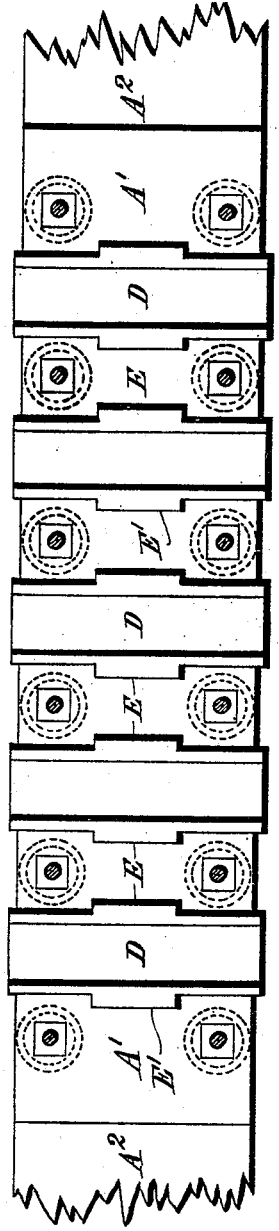
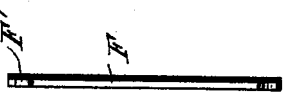
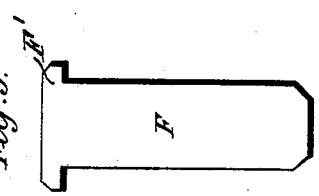
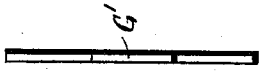
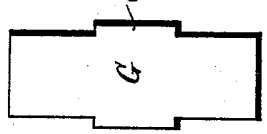
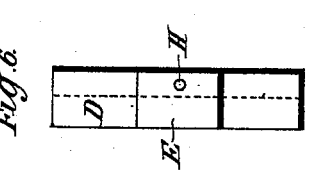
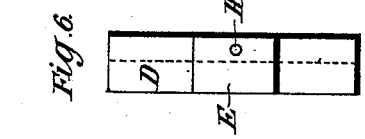
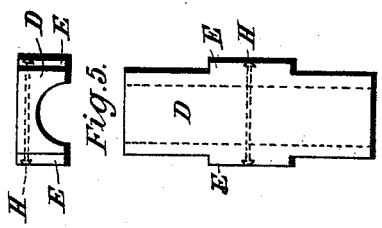
WITNESSES. INVENTOR.
John Thomas Richards
by Foster Freeman
attorneys
THE NORRIS PETERS CO., PHOTO-LITHO., WASHINGTON, D. C.

UNITED STATES PATENT OFFICE.

JOHN THOMAS RICHARDS, OF MYSORE, INDIA, ASSIGNOR TO THE SANDY-CROFT FOUNDRY AND ENGINE WORKS COMPANY, LIMITED, OF HAWARDEN, ENGLAND.

GUIDE FOR STEMS OF STAMP-MILLS, &c.

SPECIFICATION forming part of Letters Patent No. 642,630, dated February 6, 1900.

Application filed April 4, 1899. Serial No. 711,698. (No model.)

*To all whom it may concern:*

Be it known that I, JOHN THOMAS RICHARDS, a subject of Her Majesty the Queen of Great Britain, residing at Mysore, India, have invented a certain new and useful Improvement in the Guides for the Stems of Stamp-Mills or for Like Purposes, of which the following is a specification.

My invention relates to an improvement in the guides for the stems of stamp-mills, the object being to provide an arrangement of guides whereby the wear on same may be quickly and easily taken up.

According to this invention the guide-blocks are made in halves or parts and of hard wood bored in direction of the grain, the wood outside the bearing-surface being preferably riveted or otherwise secured from splitting. Each side or half of said bearing-block is provided with a projection or recess, with which engages a portion of the guide-beam, so as to prevent the guide-blocks from rising or falling with the stem. The guide-beam carrying said blocks is made in two parts, held together by bolts, the parts being so arranged that either of said beams and guide-blocks can be removed without disturbing the stamp-stems. As the guide-blocks wear they are taken out and planed on the joint and packing-plates are inserted behind and between them and the guide-beam, and this adjustment can continue to be made until the guide-blocks are entirely worn out and without in any way affecting the position of the beams or the length of the bolts required to keep them in position.

To clearly explain the invention, reference is made to the accompanying drawings, in which—

Figure 1 is a plan view of the guide-beams when fitted according to this invention, packing-pieces being shown in position behind the sections of two guides at the right of the figure. Fig. 2 is an elevation of same, and Fig. 3 is an elevation with one of the guide-beams removed. Fig. 4 is a plan of half a hard-wood block. Fig. 5 is a rear elevation of same. Fig. 6 is a side elevation of same. Figs. 7 to 10 represent packing-pieces which may be used separately or together, as found desirable.

In said drawings, A A' represent the guide-beams; B, the bolts by which the beams are held together and to the frame $A^2$; C, the side straps through which the bolts pass; D, the hard-wood guide-blocks, which seat in recesses in the beams A A' and are provided with projecting pieces E, which engage with recesses E' in the guide-beams and prevent vertical movement; F and G, the packing-pieces used to adjust the parts D as they wear away, and H a rivet passed through the back of block D to neutralize as far as possible any tendency of the block to split. Under certain circumstances soft or other metal may be substituted for the hard wood for forming the bushes.

The blocks D project from the interior faces of the beams A A', so that they may abut and be brought together when the beams are bolted together, the packing-pieces behind same being employed as the abutting faces are planed away to keep them always close together. The packing-piece G is provided with a similar projection G' to the projection E of the block; but the packing-piece F is a plain piece having a head F', by which it may be driven behind the block and which prevents it falling through the recess behind same.

In order to insert the packing-piece G, it is of course necessary to remove the blocks D from the beams A A'; but the packing-piece F may be driven behind the block D or the packing-piece G, if the latter is not sufficient, without removing either the block D or piece G from the beam. In Fig. 1 the packing-pieces F and G are shown in position behind the blocks D of the first and second guides, respectively, at the right of the figure.

What I claim is—

1. In a guide for stamp-mills and in combination with the frame, a continuous guide-beam, means for securing it to the frame, a similar continuous guide-beam and means for removably attaching it to the first beam, a series of recesses in the opposed faces of each beam, a bored guide-block formed in parts having projections outside of same, one of each parts being carried in each recess, and said recesses being of a depth to allow each part to project and abut against the other whereby the beams are held normally separated, and further recesses in each guide-beam to receive the projections of each block, whereby the parts of the latter are prevented from rising.

2. In a guide for stamp-stems and in combination, a pair of guide-beams, a recess in each in the opposed faces of the same, a bored guide-block formed in parts having projections outside of the same, one of each parts being carried in each recess and said recesses being of a depth to allow each part to project and abut one against the other whereby the beams are held normally separated, further recesses in the guide-beams to receive the projections of the block so that the parts of the latter are prevented from rising, and means for holding the beams in position so that the parts of the guide-block are held together, substantially as described.

In testimony whereof I have hereunto set my hand in the presence of two subscribing witnesses.

JOHN THOMAS RICHARDS.

Witnesses:
HENRY BRIGHTWELL,
E. BURTON.